United States Patent
Bernal et al.

(10) Patent No.: US 9,323,991 B2
(45) Date of Patent: Apr. 26, 2016

(54) METHOD AND SYSTEM FOR VIDEO-BASED VEHICLE TRACKING ADAPTABLE TO TRAFFIC CONDITIONS

(71) Applicant: Xerox Corporation, Norwalk, CT (US)

(72) Inventors: Edgar A. Bernal, Webster, NY (US); Peter Paul, Penfield, NY (US); Daniel Hann, Williamson, NY (US); Thomas F. Wade, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 219 days.

(21) Appl. No.: 14/089,887

(22) Filed: Nov. 26, 2013

(65) Prior Publication Data

US 2015/0146917 A1 May 28, 2015

(51) Int. Cl.
*G06K 9/00* (2006.01)
*G06T 7/20* (2006.01)

(52) U.S. Cl.
CPC ........ *G06K 9/00771* (2013.01); *G06K 9/00765* (2013.01); *G06K 9/00785* (2013.01); *G06T 7/2006* (2013.01); *G06T 7/2013* (2013.01); *G06T 2207/10016* (2013.01); *G06T 2207/20021* (2013.01); *G06T 2207/20036* (2013.01); *G06T 2207/30232* (2013.01); *G06T 2207/30236* (2013.01)

(58) Field of Classification Search
None
See application file for complete search history.

(56) References Cited

U.S. PATENT DOCUMENTS

| | | | |
|---|---|---|---|
| 5,208,673 A | 5/1993 | Boyce | |
| 5,606,376 A | 2/1997 | Shinohara | |
| 5,912,980 A * | 6/1999 | Hunke | G06K 9/00228 348/169 |
| 2009/0296989 A1* | 12/2009 | Ramesh | G06K 9/00771 382/103 |
| 2010/0290710 A1 | 11/2010 | Gagvani et al. | |
| 2011/0293190 A1 | 12/2011 | O'Callaghan | |

FOREIGN PATENT DOCUMENTS

EP  2 261 858 A1  12/2010

OTHER PUBLICATIONS

U.S. Appl. No. 14/017,360, filed Sep. 4, 2013, Bernal et al.
Comaniciu, D. et al., "Real-Time Tracking of Non-Rigid Objects using Mean Shift," IEEE CVPR (2000) vol. 2, Jun. 13-15, Hilton Head Island, SC, 8 pages.
Isard, M. et al., "Contour tracking by stochastic propagation of conditional density," Proc. European Conf. Computer Vision (1996) pp. 343-356, Cambridge, UK.
Kambhampati, S. S. et al., "Particle Filtering for Target Tracking," Wireless Personal and Multimedia communications (2004), Oct., 5 pages.
Ross, D. A. et al., "Incremental Learning for Robust Visual Tracking," International Journal of Computer Vision (2008) 77(1-3):125-141, Special Issue: Learning Vision, May.
Smith, K. et al., "Evaluating Multi-Object Tracking," Computer Vision and Pattern Recognition—Workshops, 2005, CVPR Workshops, IEEE Computer Society Conference, Jun. 25, 8 pages.

* cited by examiner

*Primary Examiner* — Shefali Goradia
(74) *Attorney, Agent, or Firm* — Kevin Soules; Kermit D. Lopez; Luis M. Ortiz

(57) ABSTRACT

A method and system for adaptable video-based object tracking includes acquiring video data from a scene of interest and identifying an initial instance of an object of interest in the acquired video data. A representation of a target object is then established. One or more motion parameters associated with said scene of interest are used to adjust the size of a search neighborhood associated with said target object. The target object is then tracked frame-by-frame in the video data.

20 Claims, 12 Drawing Sheets

METHOD AND SYSTEM FOR VIDEO-BASED VEHICLE TRACKING ADAPTABLE TO TRAFFIC CONDITIONS

FIELD OF THE INVENTION

Embodiments are generally related to the field of tracking applications. Embodiments are also related to methods and systems for video-based object tracking applications. Embodiments are additionally related to methods and systems for efficiently tracking objects in surveillance video.

BACKGROUND

The proliferation of traffic and surveillance cameras has led to an increased demand for automated video analytics technologies. This has vaulted such technology to the forefront of computer vision research. Automated video analytics technologies have made real-world, real-time surveillance possible. However, such real-world scenarios present a number of challenges traditional object tracking system are not equipped to handle. For example, occlusion, changes in scene illumination, weather conditions, object appearance characteristics, and camera shake cause known tracking methods and systems to fail.

Significant research efforts have been devoted to improving traffic monitoring and surveillance systems. However, environments encountered in real-world traffic and surveillance situations create unique, and as yet unsolved, problems. Prior art efforts are typically limited in scope based on the directions and speeds at which objects move. Thus, such methods are inefficient and not sufficiently robust. In particular, prior art methods and systems fail to adequately account for fluctuations in speed, varying weather conditions, times of day, traffic conditions, and other such factors. Therefore, there is a need for robust and computationally efficient methods and systems that account for, and are adaptable to, variations in the scene being monitored.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method and system for object tracking.

It is another aspect of the disclosed embodiments to provide for a method and system for object tracking in video.

It is yet another aspect of the disclosed embodiments to provide an enhanced method and system for robust and computationally efficient object tracking in surveillance applications.

The aforementioned aspects and other objectives and advantages can now be achieved as described herein. A method and system for video-based object tracking comprises selecting at least one motion parameter from a plurality of motion parameters associated with a scene of interest, adjusting a size of a search neighborhood associated with the target object according to the at least one motion parameter, and determining a frame-by-frame location of the target object using the adjusted search neighborhood size, in order to track the target object in the video data. The method of selecting the at least one motion parameter and adjusting the size of the search neighborhood can be applied separately to each of a plurality of motion directions associated the said scene of interest.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
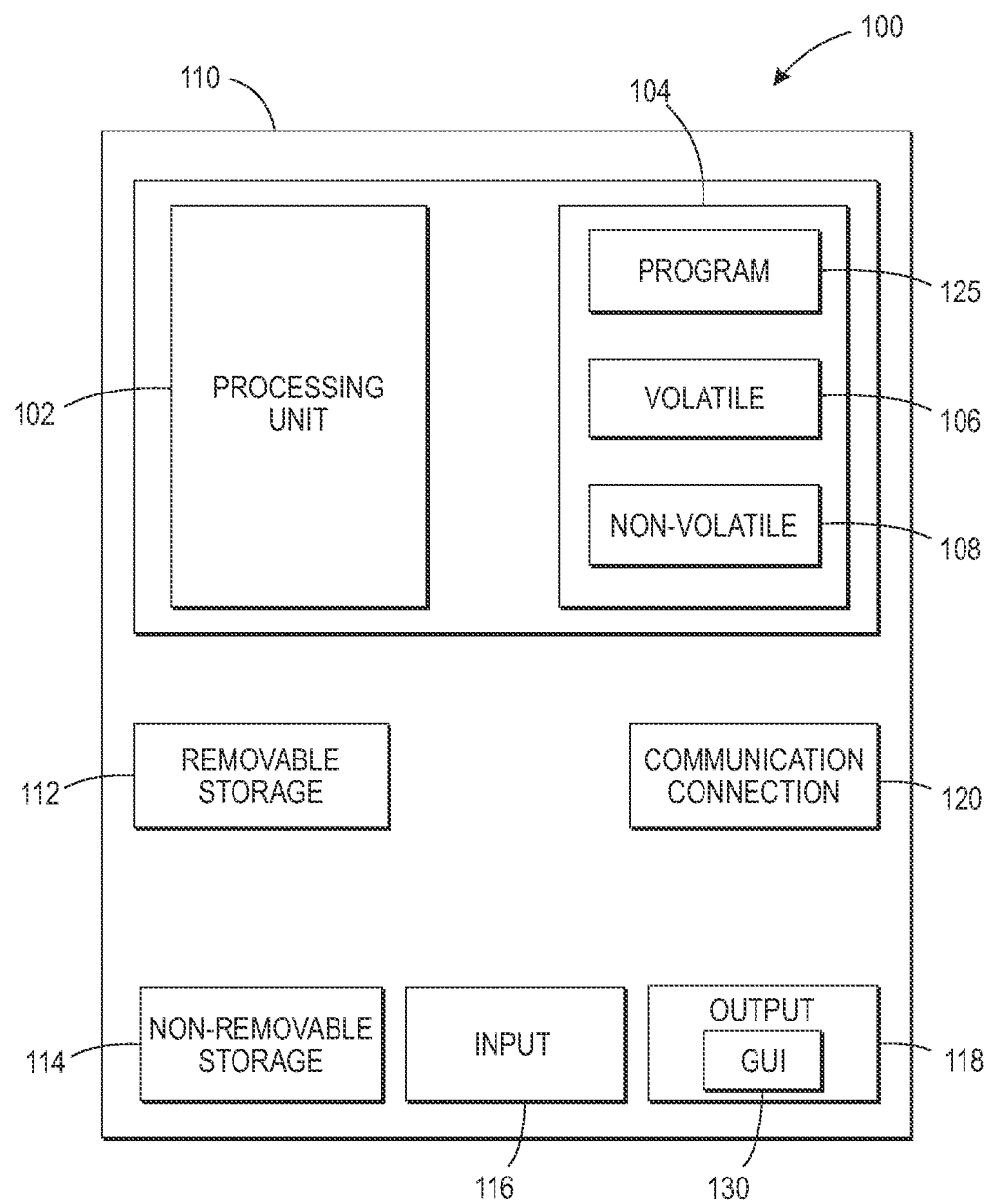
FIG. 1 depicts a block diagram of a computer system which is implemented in accordance with the disclosed embodiments.
Figure 2:
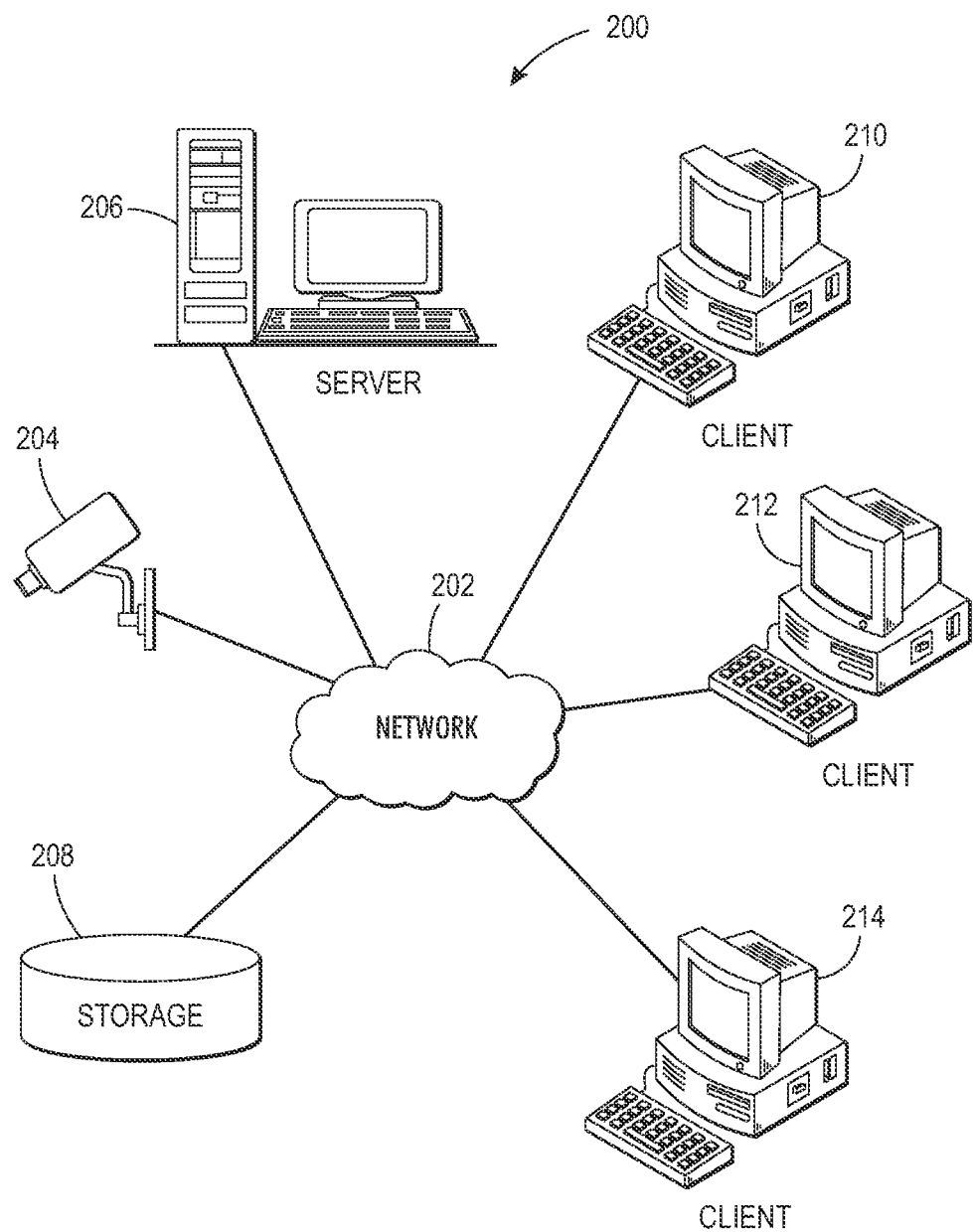
FIG. 2 depicts a graphical representation of a network of data-processing devices in which aspects of the present invention may be implemented.
Figure 3:
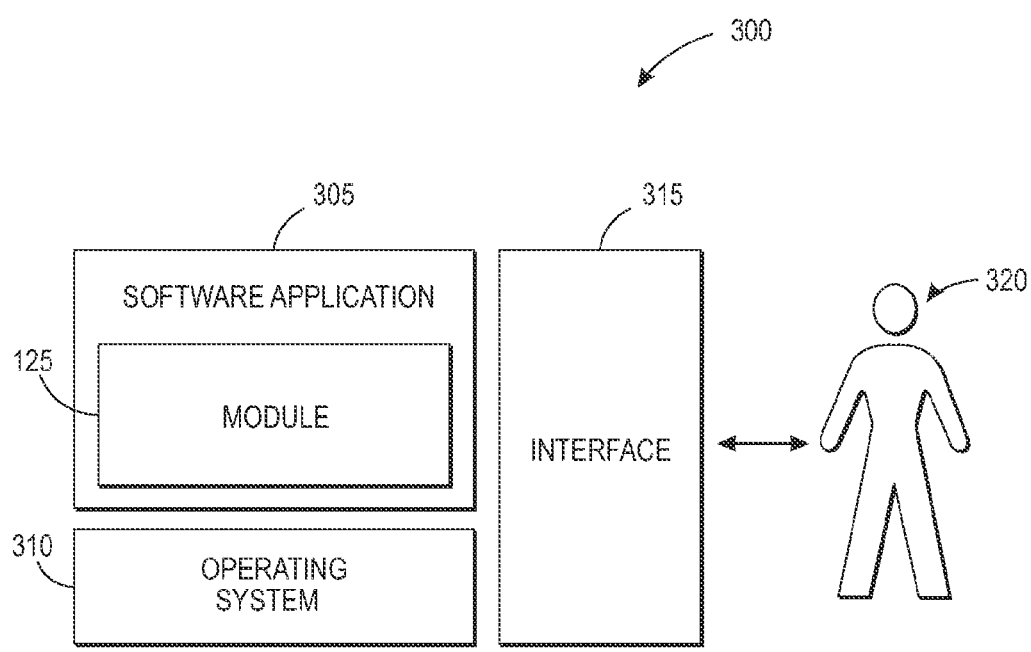
FIG. 3 depicts a computer software system for directing the operation of the data-processing system depicted in FIG. 1, in accordance with an example embodiment.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing the methods and systems disclosed herein is shown in FIG. 1. A general computing device in the form of a computer 110 may include a processing unit 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data, including data comprising frames of video or still images.

Computer 110 may include or have access to a computing environment that includes input 116, output 118, and a communication connection 120. The computer may operate in a networked environment using a communication connection to connect to one or more remote computers or devices. The remote computer may include a personal computer (PC), server, router, network PC, a peer device or other common network node, or the like. The remote device may include a photographic camera, video camera, tracking device, or the like. The communication connection may include a Local Area Network (LAN), a Wide Area Network (WAN) or other networks. This functionality is described in more fully in the description associated with FIG. 2 below.

Output 118 is most commonly provided as a computer monitor, but may include any computer output device. Output 118 may also include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse, and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module 125, which can be representative of other modules described herein, are stored on a computer-readable medium and are executable by the processing unit 102 of computer 110. Program module 125 may include a computer application. A hard drive, CD-ROM, RAM, flash memory, and a USB drive are just some examples of articles including a computer-readable medium.

FIG. 2 depicts a graphical representation of a network of data-processing systems 200 in which aspects of the present invention may be implemented. Network data-processing system 200 is a network of computers in which embodiments of the present invention may be implemented. Note that the system 200 can be implemented in the context of a software module such as program module 125. The system 200 includes a network 202 in communication with one or more clients 210, 212, and 214. Network 202 is a medium that can be used to provide communications links between various devices and computers connected together within a networked data processing system such as computer system 100. Network 202 may include connections such as wired communication links, wireless communication links, or fiber optic cables. Network 202 can further communicate with one or more servers 206, one or more external devices such as video camera 204, and a memory storage unit such as, for example, memory or database 208.

In the depicted example, video camera 204 and server 206 connect to network 202 along with storage unit 208. In addition, clients 210, 212, and 214 connect to network 202. These clients 210, 212, and 214 may be, for example, personal computers or network computers. Computer system 100 depicted in FIG. 1 can be, for example, a client such as client 210, 212, and/or 214. Alternatively, clients 210, 212, and 214 may also be, for example, a photographic camera, video camera, tracking device, etc.

Computer system 100 can also be implemented as a server such as server 206, depending upon design considerations. In the depicted example, server 206 provides data such as boot files, operating system images, applications, and application updates to clients 210, 212, and 214, and/or to video camera 204. Clients 210, 212, and 214 and video camera 204 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a computer software system 300, which may be employed for directing the operation of the data-processing systems such as computer system 100 depicted in FIG. 1, in accordance with an example embodiment. Software application 305 may be stored in memory 104, on removable storage 112, or on non-removable storage 114 shown in FIG. 1, and generally includes and/or is associated with a kernel or operating system 310 and a shell or interface 315. One or more application programs, such as module(s) 125, may be "loaded" (i.e., transferred from removable storage 114 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, mini-computers, mainframe computers, servers, and the like.

Note that the term "module" as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term "module" may also simply refer to an application such as a computer program designed to assist in the performance of a specific task such as, for example, word processing, accounting, inventory management, etc.

The interface 315 (e.g., a graphical user interface 130) can serve to display results, whereupon a user 320 may supply additional inputs or terminate a particular session. In some embodiments, operating system 310 and GUI 130 can be implemented in the context of an operating system that makes use of graphical "windows" to facilitate user interaction. It can be appreciated, of course, that other types of systems are possible. For example, other operating systems such as, for example, a real time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of a data-processing system such as computer system 100, in conjunction with program module 125, and data-processing system 200 and network 202 depicted in FIGS. 1-3. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Macintosh, UNIX, LINUX, and the like. Therefore, the descriptions of the exemplary embodiments, which follow, are for purposes of illustration and not considered a limitation.

Video-based object tracking refers to determining the motion of an object across a number of video frames, N. Real-world scenarios present a number of challenges to existing object tracking algorithms that include occlusions, changes in scene illumination, weather conditions, object appearance, and camera shake. The presently described embodiments utilize parameters indicative of, for example, fluctuations in vehicle speed that may result from varying weather conditions, times of day, traffic congestion, etc. The embodiments disclosed herein exploit available external information regarding the state of traffic conditions in order to provide more robust and computationally efficient tracking.

Figure 4:
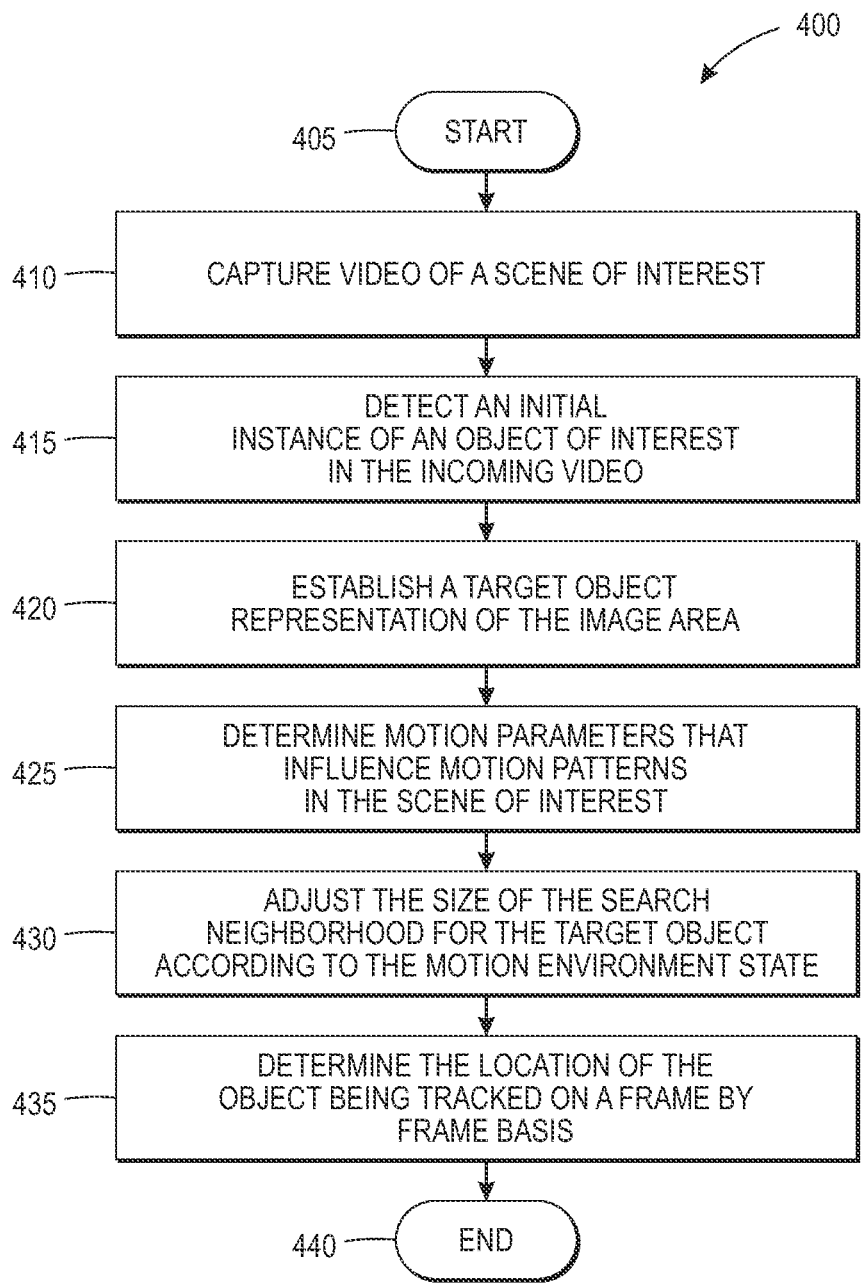
FIG. 4 depicts a high level flow chart illustrating logical operational steps in an object tracking method in accordance with the disclosed embodiments.

FIG. 4 illustrates a high-level flow chart 400 of logical operational steps associated with a real-time adaptable video tracking method in accordance with one embodiment of the invention. This method allows for real-time, or very near real time, adaptable video tracking in surveillance applications. Most commonly, this method can be used in traffic management, pedestrian or traffic monitoring, fee collection, surveillance, and photo enforcement applications. The method begins at step 405.

The first step is to collect video of the scene of interest as shown at step 410. Generally, a surveillance camera captures video of the scene. A scene of interest may be a road, highway, bridge, tunnel, traffic intersection, parking garage, pedestrian thoroughfare, train track, train station, or the like. It should be appreciated that the claimed methods and systems could be advantageously implemented in other surveillance and tracking applications and that the list above is exemplary and is not intended to limit the scope of the invention. Note that the collection of video data can occur while subsequent processing occurs on previously collected video frames, which are sometimes referred to as "real-time" processing of the video data.

The camera used to collect video of the scene can be any surveillance camera. Such a camera may be an IP camera with at least Video Graphics Array ("VGA") pixel resolution of 640×480 pixels and a frame rate of at least 15 frames per second. In an alternative embodiment, the camera can comprise a wide-angle RGB camera with a pixel resolution of at least 800×600 pixels and a frame rate of at least 25 frames per second. Video data can optionally be spatially or temporally down or up sampled. Furthermore, the video camera or other surveillance device can include an illumination source, or may take advantage of ambient illuminations sources as necessary.

Next at step 415, an initial instance of an object of interest is extracted from the incoming video. For example, in a traffic surveillance application, an object of interest might be a vehicle. At step 415, the initial entrance of a vehicle into the scene of interest is extracted. This initial extraction can be achieved by applying one of, or a combination of, a frame differencing technique, a background subtraction technique, and a computer vision technique for object localization on the collected video of the scene.

Background subtraction is a technique used for foreground object extraction within a scene. Background subtraction involves subtracting or comparing a current frame to a background estimate and then thresholding the resulting difference image. Pixels that are above a pre-determined threshold $T_B$ are deemed to belong to the foreground. In order to minimize the effects of noise and like-colors in background and foreground areas, morphological operations such as erosion, dilation, and hole filling can be applied on the resulting binary image. Background estimates can be obtained in multiple ways. For example, a running average or median of the previous n frames, for a given integer n, can be considered a background. Auto-regressive background models that update a running average with the current frame via a weighted sum combination can also be used. Alternatively, a mixture of Gaussians for each pixel or pixel block can be built which describes the historical statistical behavior of the color characteristics of the pixel or pixel blocks. If a current pixel value adheres to that historical behavior, it is evaluated to be a background pixel; otherwise, it is considered a foreground pixel. Other background estimates such as eigenbackgrounds or static images of an empty scene can alternatively be utilized as background estimates.

Figure 4A:
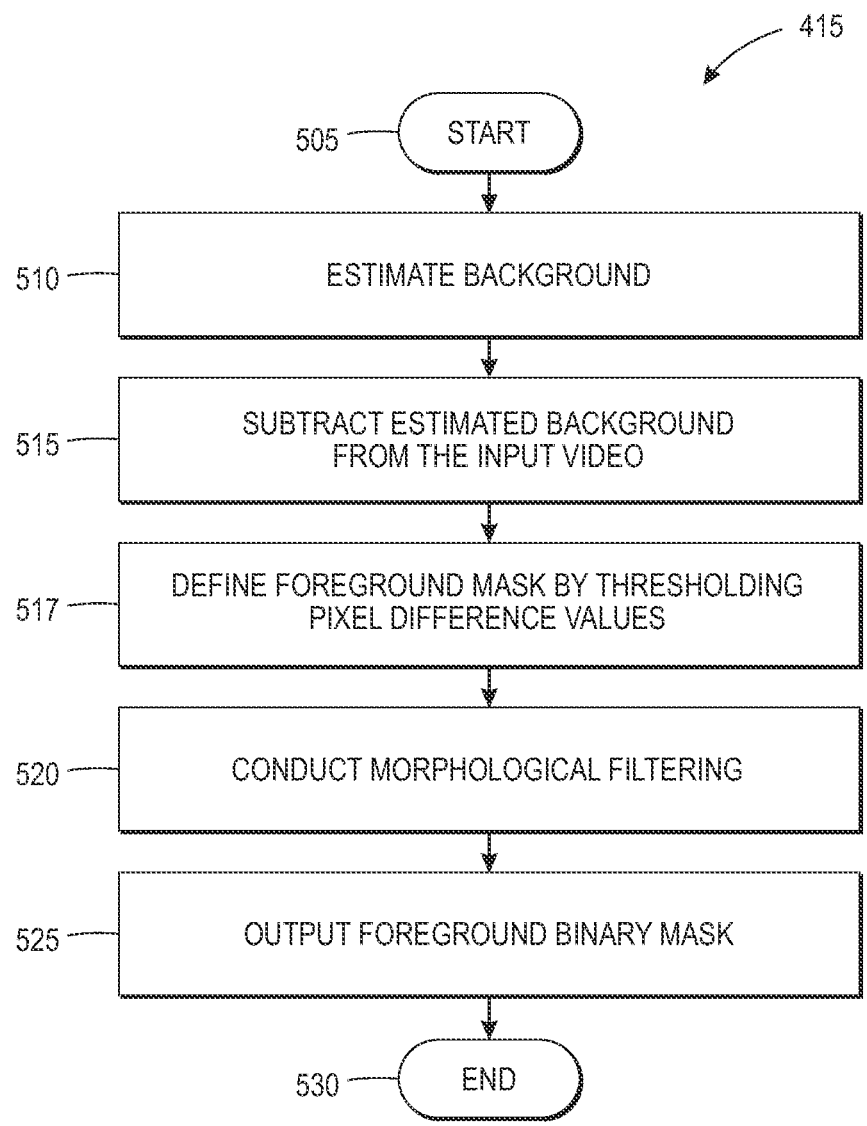
FIG. 4A depicts a detailed flow chart illustrating logical operational steps associated with method step 415 in accordance with the disclosed embodiments.

FIG. 4A shows detailed steps associated with a background estimation and subtraction technique used in accordance with step 415. The method begins at block 505. In one embodiment, a background subtraction can be performed on the video to extract the initial instance of an object of interest. In this embodiment, an estimation of the background is performed, as described above at block 510. A pixel-wise subtraction between the estimated background and the current input video frame of the scene is then computed as illustrated by block 515. A thresholding operation is then conducted at block 517 where pixels difference values above a predetermined threshold are deemed to correspond to foreground objects as indicated by a binary foreground mask on which morphological operations at block 520 are then applied. Block 525 illustrates that the output is a binary mask of the scene with pixel dimensions equivalent to that of the sampled video, a value of 0 where motion is not detected, and a value of 1 where motion is detected. Note that in the case where a statistical model of the background is maintained, instead of pixel-wise differences, pixel-wise fit tests that determine whether pixel values in the current frame correspond to their respective models are performed. The output in this case is, for example, a probability of the pixel value belonging to its background model; this probability can in turn be thresholded, and operations can continue as in the background subtraction case.

Figure 4B:
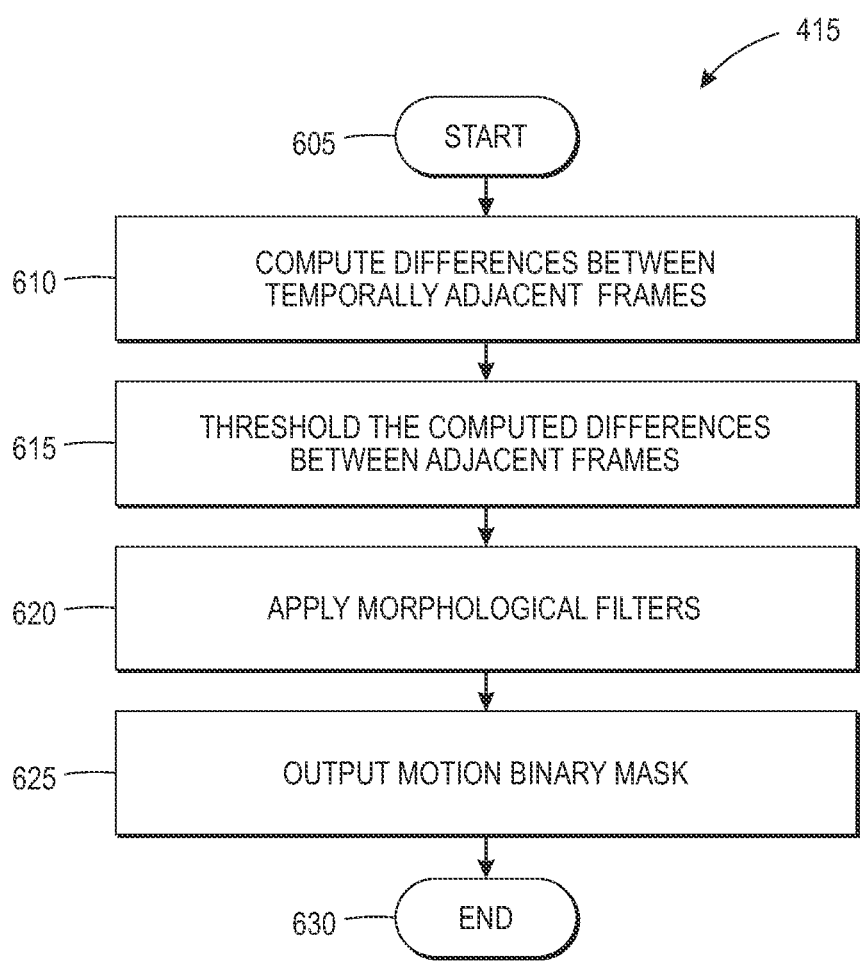
FIG. 4B depicts a detailed flow chart illustrating logical operational steps associated with method step 415 in accordance with the disclosed embodiments.

In an alternative embodiment, a frame differencing technique for motion extraction can be used. Frame differencing, unlike background subtraction, does not require maintenance of a background estimate. Accordingly, frame differencing does not distinguish between foreground and background objects in a scene, but rather identifies moving objects. FIG. 4B illustrates steps associated with general step 415 using a frame differencing technique. The steps begin at 605. In frame differencing, a difference, or set of differences, between temporally adjacent frames is computed at step 610 and thresholded as shown at step 615. Pixels in the difference image that are above a threshold $T_B$ are deemed to correspond to objects in motion. As in the background subtraction process, the resulting thresholded image may be morphologically filtered at step 620.

For example, in an alternative embodiment, a double-frame difference technique followed by thresholding and morphological operations can be performed on the collected video. The result is a binary mask with the same pixel dimensions as the sampled input video as illustrated at step 625. The mask has values of 0 at pixel locations where no motion is detected, and values of 1 at pixel locations where motion is detected. A bounding box surrounding the detected object may be applied to the captured video surrounding the area where the object was detected. The method ends at step 630.

The above example uses the extraction of motion to identify an object of interest in the scene. However, other characteristics of an object can alternatively be used to identify an object of interest such as color, shape, size, texture, position, speed, acceleration, etc.

Figure 4C:
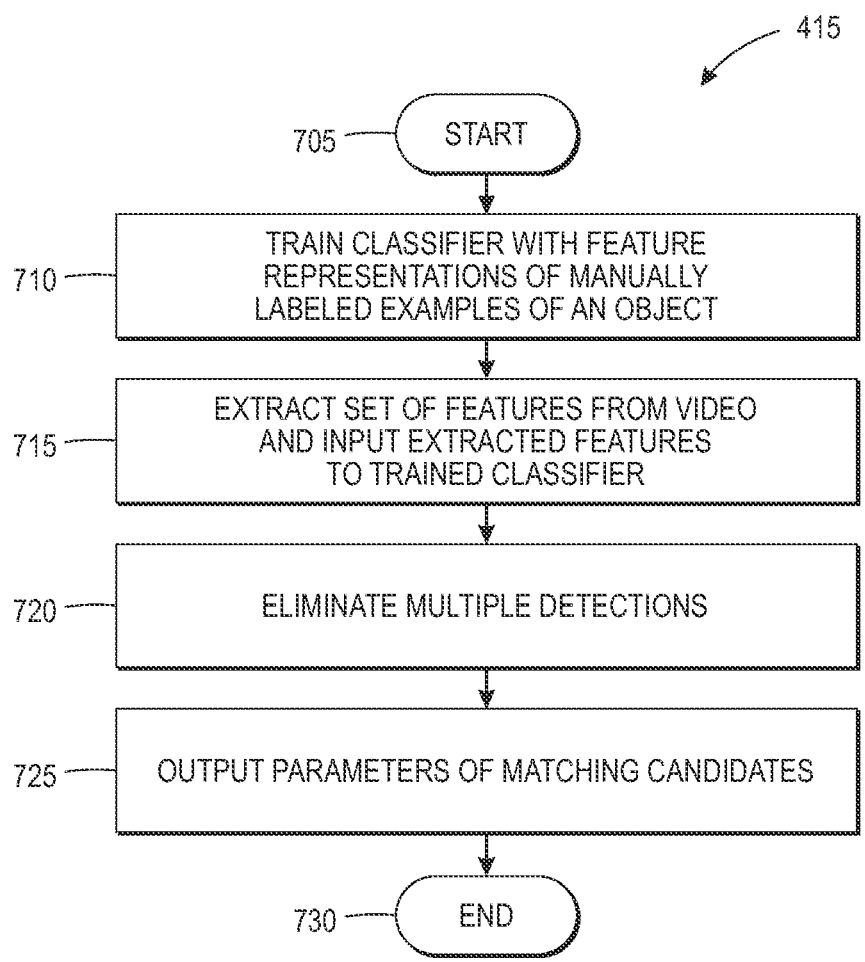
FIG. 4C depicts a detailed flow chart illustrating logical operational steps associated with method step 415 in accordance with the disclosed embodiments.

Computer vision techniques, shown as FIG. 4C for object extraction from still images can also be applied to extract an initial instance of an object of interest and establish a target representation of the image area in step 415. These techniques rely on a training stage in which a statistical classifier learns the appearance of the object of interest (e.g., vehicle, person, animal, etc.) in a predetermined feature space (e.g., Harris Corners, SIFT, SURF, HOG, LBP, etc.). The training starts at step 705 and is performed by feeding the classifier (e.g., SVM, EM, k-NN, neural networks, clustering algorithms, etc.) feature representations of manually labeled positive and negative examples of the object of interest as shown at step 710. Object extraction in a given frame is performed at step 715 by extracting the same set of features and running the classifier on sub-images of the frame of interest, where the location of these sub-images may be limited to a pre-determined region of interest (ROI). This procedure is typically implemented in the form of a sliding window search followed by individual window classification and non-maximal suppression to eliminate multiple extractions corresponding to the same object illustrated at step 720. The outputs from the classifier are parameters of bounding boxes (e.g., location, height, and width) surrounding the matching candidates as described at step 725. The method ends at step 730. These alternative techniques can be applied independently or in conjunction with one another.

These alternative techniques can be applied independently or in conjunction with one another to detect an initial instance of an object of interest in the captured video of the scene being monitored at step 415 of flow chart 400.

The extracted object is then provided to an object characterization module so that a target object representation of the image area can be created as illustrated at step 420. In this step, a target object representation of the image area, which has been determined to contain an object of interest at step 415, is formed. In one embodiment, the color features of the extracted object can be used to represent an object in motion. For example, a three-dimensional histogram of the RGB pixel values with a given number of bins (e.g., 8, 16, 24) along each dimension can be constructed describing the region where motion is detected.

In an alternative embodiment, any feature representative of the object of interest can be used to create the target representation including shape, size, or spatial features of the object such as position of car headlights, window location, etc. Such feature representation can include texture appearance (using wavelet or DCT representations, or alternatively, textons or LBP histograms), gradient orientation and magnitudes (HOG), and clouds of point descriptors (Harris Corners, SIFT, and SURF).

At step 425 a set of motion parameters that are currently influencing, or will in the future influence the motion patterns in the scene of interest are determined. Ultimately, the motion parameters associated with the scene of interest will be selected according to the pattern of motion in the scene and scene characteristics. The motion parameters that will be applicable depend heavily on the application.

For example, in the general scenario where the scene of interest is a roadway being monitored, the applicable motion parameters may include traffic volume, time of day, time of year, the specific date, the day of the week, weather conditions, vehicle count, traffic speed, pedestrian traffic, police activity in the area, and incident reports associated with the area. More specifically, when the scene of interest is a highway, speed of traffic and police activity may be very important, but pedestrian traffic may not. In other examples, the parameters may differ. For example, in a parking garage application, traffic speed may not be a relevant parameter, but time of day and day of week will be exceptionally important.

These parameters can be used to define a Motion Environment State. The applicable parameters are constantly being evaluated such that changes in the scene dynamics may require the application of different or new parameters. Generally, the Motion Environment State changes at a rate much lower than the mean rate of the vehicles. Therefore, a significant number of vehicles might pass through the scene without significant change to the Motion Environment State.

Similar parameters might also be applicable in surveillance applications where pedestrians are being tracked on a street or in a building.

Other parameters that are indicative of the Motion Environment State can include delivery schedules, parking lot capacities and occupancy rates, roadway traffic rates, retail promotions, or other such occurrences that would affect the traffic flow rate for the scene of interest.

Step 430 illustrates that the Motion Environment State is used to adjust the size of the search neighborhood for the target object. For example, from a high level perspective, in order to track the target object, tracking algorithms perform a search across a neighborhood centered at the current location of the target. The Motion Environment State accounts for the motion parameters that are affecting the traffic flow. Thus, the Motion Environment State is used to adjust the size of the search neighborhood.

It should be appreciated that a video imaging system is inherently a Discrete-Time Sampled Data System because the video data is composed of frames which are essentially still image snapshots taken at discrete moments in time. Thus the action of objects in the scene between the discrete moments in time is not directly monitored, but is inferred from the still image frames and certain assumptions on motion dynamics of the objects (i.e., the range of speed of motion, range of acceleration, etc.). The Motion Environment State gives an implicit indication of the action of the objects between the video frames, and thus an indication of an appropriate search neighborhood for the target object.

For example, when traffic conditions are light, vehicles are expected to move faster, and the size of the search neighborhood is increased. Conversely, when traffic is congested or a high traffic volume is detected, the size of the search neighborhood is decreased. Since the computational complexity of the tracking algorithm is closely related to the size of the search neighborhood, incorporating the motion parameters via the Motion Environment States allows for more efficient use of the available computational resources than a traditional tracking algorithm with fixed neighborhood size. Furthermore, increasing the search neighborhood when the Motion Environment State suggests vehicle speeds are higher reduces the likelihood of missing or losing tracking of a vehicle that moved further than a fixed search neighborhood may be able to accommodate.

In one embodiment, a nominal search window size N×M pixels is determined to correspond to a reference traffic flow F, being indicative of a number of vehicles per unit of time that traverse the area when a nominal set of conditions are present. A current traffic flow f of vehicles across the area of interest can be measured based on the number of vehicles per unit of time that have traversed the area in the recent past. A normalized traffic flow measure can be determined by computing the ratio between the measured traffic flow f and the reference traffic flow F. The Motion Environment State can, in this case, be quantified as f/F and the search window size can be modified according to equation (1):

$$[NF/f] \times [MF/f], \quad (1)$$

wherein the [ ] operator indicates a "round" operation that maps a real number to its nearest integer. Other traffic statistics such as current and nominal average vehicle speed and current and nominal vehicle count can be used to determine the Motion Environment State.

In another embodiment, a look-up table with search window sizes corresponding to different times of day, times of year, specific dates and weather conditions can be maintained. A Motion Environment State would be determined by extracting the table entry corresponding to the determined condition.

It should be noted that the nominal search window size can be spatially dependent to account for changes in apparent size of objects due to the perspective and/or distortion and to account for changes in appearance of an object due to its orientation relative to the camera. For example, due to the projective nature of a camera, real-world dimensions of locations of a scene farther away from the camera appear smaller (in terms of number of pixels) than those of locations closer by. Consequently, nominal search neighborhoods may be smaller at locations farther from the camera than at closer locations. In another example, a "fisheye" lensed camera usually introduces extreme barrel distortion in order to achieve wide angles of view. This tradeoff results in spatially varying image magnification, wherein the degree of magnification decreases with an object's distance to the camera's optical axis; in this case, nominal search neighborhoods may be smaller at locations farther from the optical axis of the camera than at closer locations.

It should also be noted that, for a given scene, multiple Motion Environment States may apply. For example, in a scene comprising a four-way intersection, one or more directions of traffic flow may be affected by different factors relative to other directions. In this case, different Motion Environment States may more accurately describe patterns of motion along each of the traffic directions being monitored. In a scene where there is road work down the road farther north relative to the location of the camera, traffic flowing from south to north may move at a slower pace than traffic moving east-west and west-east. Conversely, traffic moving from north to south may move at an even faster pace. In this case, up to three different Motion Environment States may apply.

The method then continues to step 435 where an object localization module determines the location of the object on a frame-by-frame basis. The key to this step is that the search for the object is localized and the search neighborhood is adjusted according to the Motion Environment State. Note that for tracking an object forward in time, the location of the object is determined on a frame-by-frame basis processing the frames forward in time, which is the case in 'real-time' video processing. However, for tracking an object backward in time, the location of the object can be determined on a frame-by-frame basis processing the frames backward in time for video data that has been captured in batch form.

The object localization step 435 can be utilized to determine the location of the object being tracked by finding the best-matching location in the current frame for the feature representation of the object being tracked as obtained in step 420 in the initial frame where the object was extracted. In some embodiments, the representation of the object may be updated periodically in order to account for potential changes in appearance due to motion, change of perspective, change in illumination conditions, etc. This operation is performed across a multiplicity of frames, while the object is determined to be in the scene of interest. A variety of methods exist for tracking an object in a video, which rely on optimization techniques. One skilled in the art will appreciate that the steps in method 400 could be extended to nearly any of these.

In one alternative embodiment, step 435 is accomplished using template-matching tracking. Template-matching tracking operates by searching for a best match according to a similarity metric between a template and a set of candidate samples. Unlike other tracking methods, which are iterative, template-matching tracking exhaustively searches for matches within a neighborhood of interest.

Figure 5A:
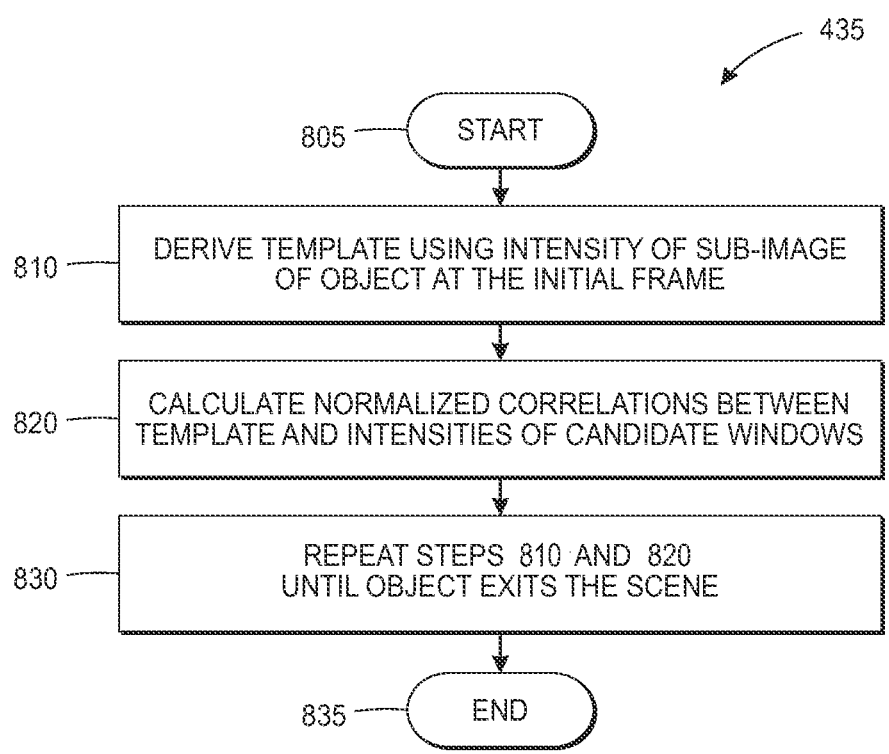
FIG. 5A depicts a detailed flow chart illustrating logical operational steps associated with method step 435 in accordance with the disclosed embodiments.

An example of template-matching tracking and detailed steps associated with step 435 are shown in FIG. 5A and can progress as follows. The method starts at step 805. At step 810, a template is derived using the intensity IT of a sub-image of the target object at the initial frame, centered at a detected point of interest (e.g., detected via the Harris Corners or other salient point detection method or according to the foreground or motion locations as identified by a binary mask). For subsequent frames within the neighborhood of interest (determined and adjusted according to motion parameters and Motion Environment State at step 430) normalized correlations between the template IT and the intensities of the candidate windows of the current frame are calculated as shown at step 820. The position where the maximal normalized correlation occurs is considered the position of the tracked object in the current frame. This procedure is repeated, at step 830, until the object exits the scene and tracking is complete and the method ends at step 835.

The computational savings are achieved by limiting the candidate search neighborhood size according to the Motion Environment State. A combination of computational efficiency and robustness can be achieved by further adjusting the size of the candidate search area according to the desired computational efficiency and desired robustness.

Figure 5B:
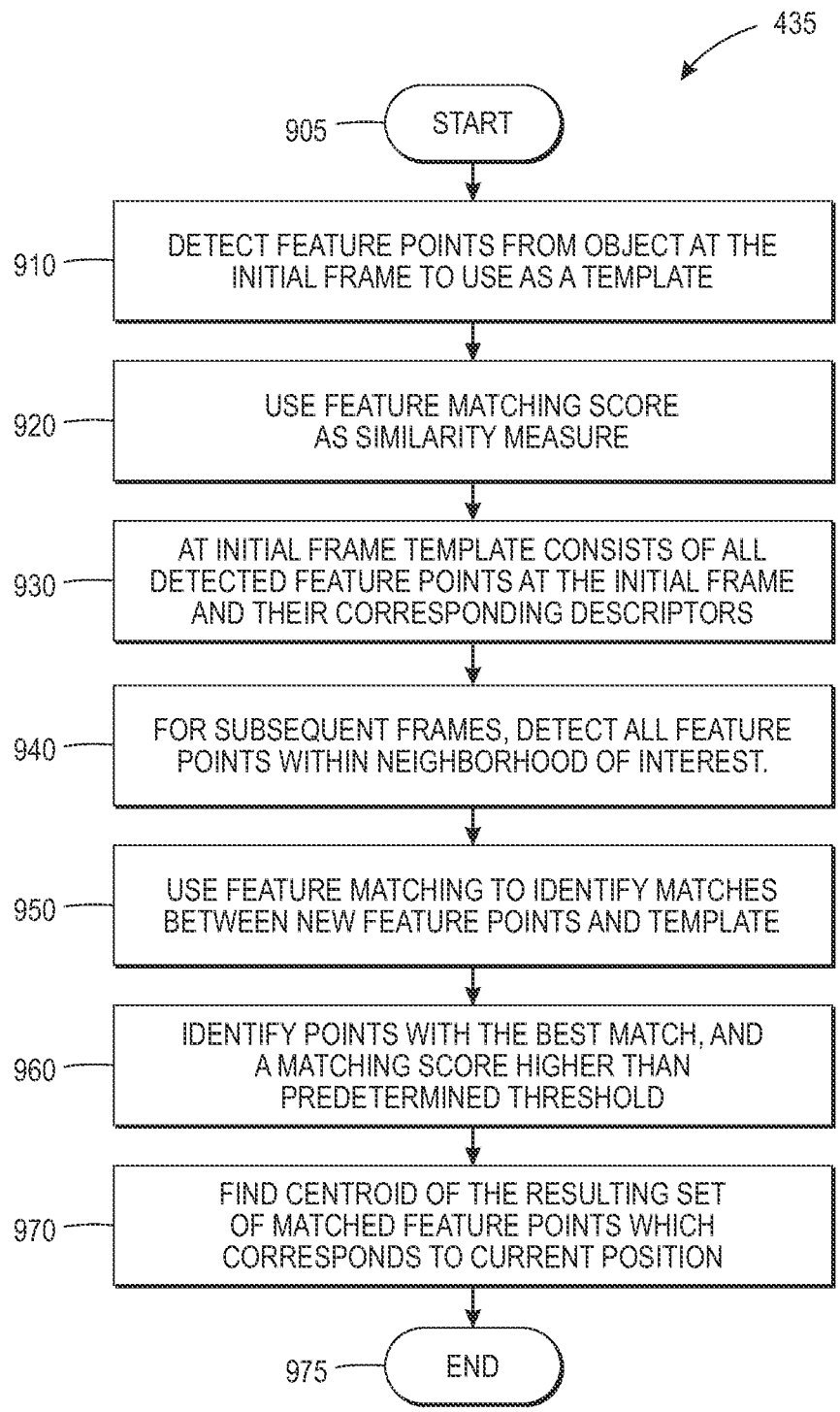
FIG. 5B depicts a detailed flow chart illustrating logical operational steps associated with method step 435 in accordance with the disclosed embodiments.

In an alternative embodiment illustrated in FIG. 5B, point tracking can be used, starting at step 905. The method identifies salient features and extracts descriptors of the features (including but not limited to Scale-Invariant Feature Transforms or "SIFT", Speeded-Up Robust Feature or "SURF", Harris Corners, and Kanade Lucas Tomasi or "KLT") extracted from the object at the initial frame as a template shown at step 910. Next at step 920, the feature matching score can be used as the similarity measure to establish correspondences between the extracted features across adjacent frames. This tracking method can start with a template that consists of all detected feature points associated with the object at the initial frame and their corresponding descriptors as described at step 930. Then at step 940, for subsequent frames within the neighborhood of interest (again, determined and adjusted according to the Motion Environment State and motion parameters provided at step 430) all feature points are detected. The feature matching or feature correspondence procedure is used to identify matches between the newly detected feature points and the feature points from the template, illustrated at step 950. Then at step 960, points with the best match and with a matching score higher than a predetermined threshold are considered a match and are kept. Affine consistency checks between both sets of features for which correspondences were established may be performed to verify that the pattern of motion of the feature set corresponds to the type of object being tracked (e.g., a rigid object). The centroid (or weighted average position, or other functions thereof) of the resulting set of matched feature points is then the current position of the object shown at step 970. Other functional combinations of individual feature locations can be used to describe the location of the object. The method ends at step 975.

Template matching and point tracking work well when the tracked object has distinct features such as texture, color, etc. It is most suitable for processing video frames with high spatial resolution. It also has the advantage of tracking the object at the object's specific location and is therefore well suited, for example, for applications that estimate speed based on the collected video. Although template matching tracking can be computationally expensive, adjusting the neighborhood size as shown at step 430 can greatly reduce this inefficiency.

Figure 5C:
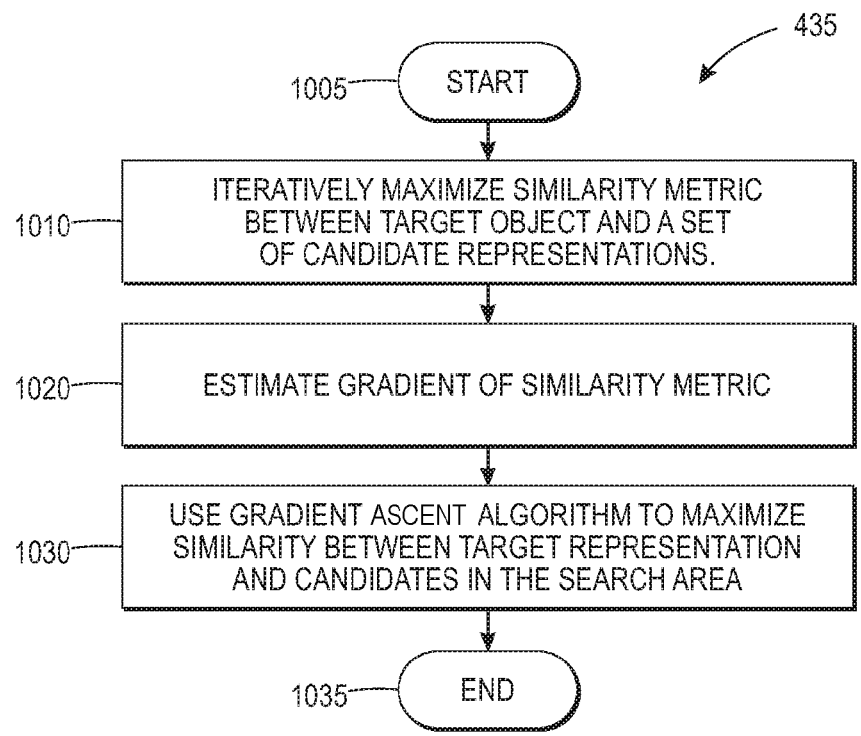
FIG. 5C depicts a detailed flow chart illustrating logical operational steps associated with method step 435 in accordance with the disclosed embodiments.

In an alternative embodiment shown in FIG. 5C, mean shift tracking can be used to determine the location of the object. The method starts at step 1005. Mean shift tracking operates by iteratively maximizing a similarity metric (e.g., Bhattacharyya Coefficient) between the target object's color histogram, representation provided at step 420, and a set of candidate histogram representations in a neighborhood centered at the current location of the target at step 1010. Instead of exhaustively searching across all possible candidates, mean shift tracking estimates the gradient of the similarity metric at step 1020 and performs a gradient ascent algorithm that maximizes the similarity between the target histogram representation and the candidates in the search area illustrated by step 1030. The method ends at step 1035. The size of the search neighborhood can be adjusted according to the Motion Environment State.

Figure 5D:
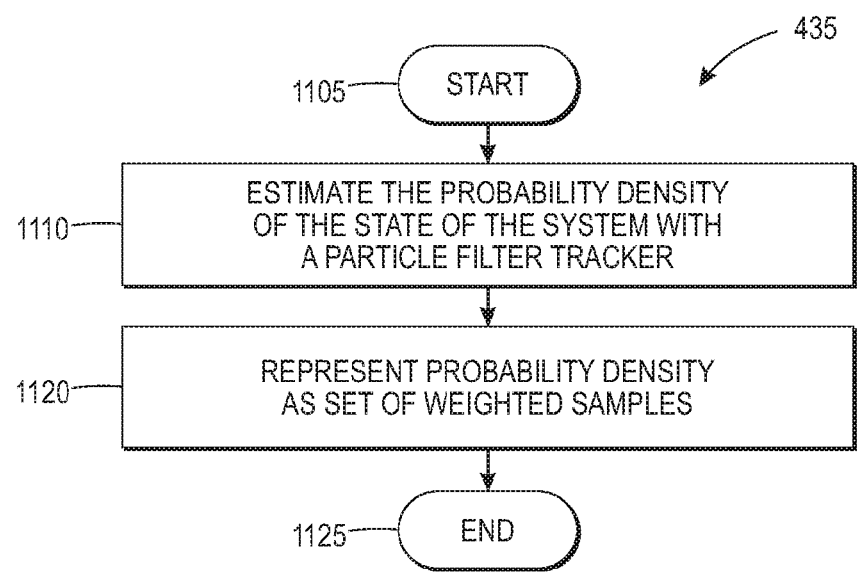
FIG. 5D depicts a detailed flow chart illustrating logical operational steps associated with method step 435 in accordance with the disclosed embodiments.

In another example embodiment shown in FIG. 5D, a particle filter tracker can be utilized to determine the location of the target object. This method starts at step 1105. At step 1110, a particle filter tracker estimates the probability density of the state of the system. This typically includes (but is not limited to) the location of the target object. The probability density is represented as a set of weighted samples or particles at step 1120. The method ends at step 1125.

The method of FIG. 4 ends at block 440 after the objects location has been determined and the object has been tracked across the scene or region of interest.

Figure 6:
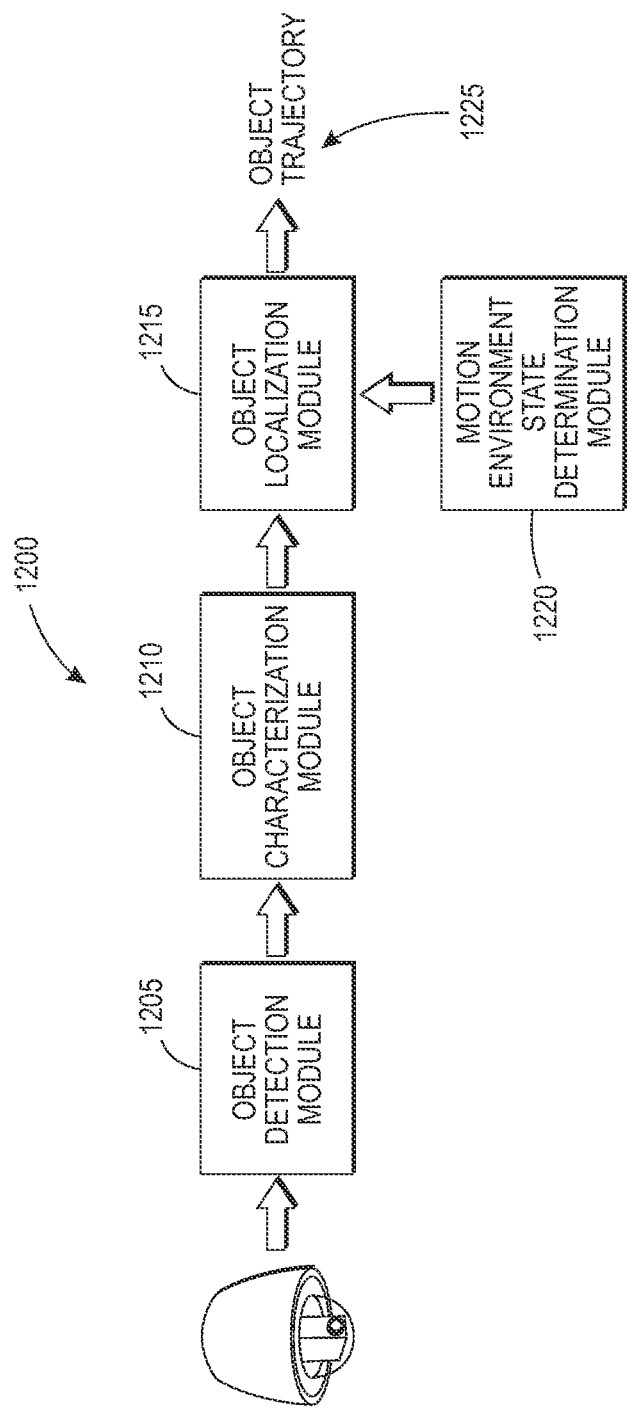
FIG. 6 depicts a block diagram of modules associated with an object tracking system and method in accordance with disclosed embodiments.

FIG. 6 illustrates a block diagram of modules associated with an object tracking method and system. These modules may comprise hardware and/or software associated with a computer system such as computer system 100 and can be implemented using both the computer system 100 and/or the network 200. A video acquisition module 204 is used to monitor a scene of interest. Video acquisition module 204 can be any type of video camera, but is preferably an IP camera with a pixel resolution of at least 640×480 pixels and capable of frame rates of at least 15 frames per second. Alternatively, video acquisition module 204 can comprise previously captured video stored as data in memory, such as memory 104, removable storage 112, or non-removable storage 114.

Video acquisition module 204 provides data to object extraction module 1205. Object extraction module 1205 extracts the initial instance of an object of interest in the incoming video data. Once an initial instance of an object of interest has been extracted, object characterization module 1210 establishes a target object representation of the image area where the object extraction module extracted the initial instance of the target object. Object characterization module 1210 can make use of any number of object features, alone or in conjunction, to construct the target object representation of the image area. These can include color features, texture appearance, gradient magnitude, and clouds of point descriptors such as Harris Corners, SIFT, and SURF.

A Motion Environment Determination module 1220 is used to identify parameters that influence motion patterns in the scene being monitored such as traffic conditions, weather, historical traffic patterns given time of day and date, traffic incident reports, etc. These parameters are used to generate one or more Motion Environment states that are indicative of the state of motion in the scene of interest along one or more directions of motion or in and around one or more regions of interest. The Motion Environment state is continuously or periodically updated to account for changes in the scene of interest. These changes are embodied in the motion parameters that are used to set the Motion Environment State. Therefore, this module and associated method step 430 may be iteratively, periodically, or continuously utilized to provide output indicative of the Motion Environment State to the Object Localization module 1215.

Data from the object characterization module 1210 and the Motion Environment State module 1220 are provided to an object localization module 1215. Module 1215 determines the location of the target object on a frame-by frame basis. The output from the likely trajectory determination module 1220 in conjunction with the object representation provided by the object characterization module 1210 is used to prioritize the search for the target object conducted by the object localization module 1215, by adjusting the size of the search neighborhood depending on the Motion Environment State. The object localization module 1215 locates the target object, frame-by-frame, until the target object exits the scene being monitored by the video acquisition module 204, thereby providing the object trajectory 1225 and tracking the target object through the scene.

Figure 7:
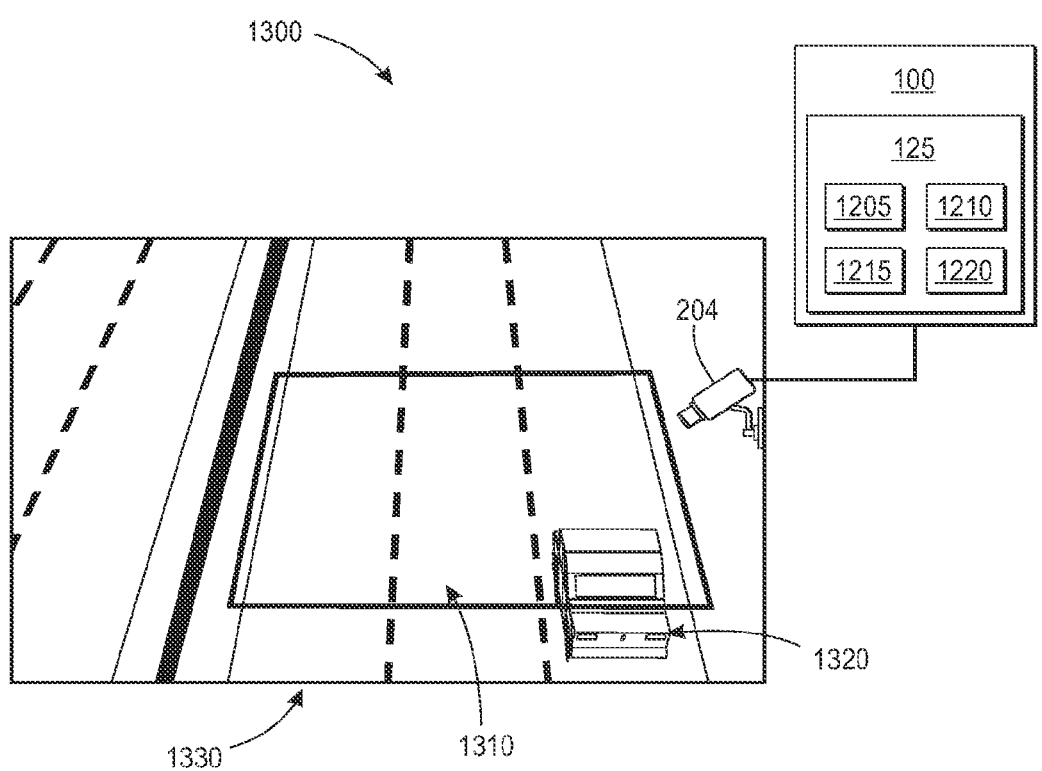
FIG. 7 depicts a system for object tracking in accordance with the disclosed embodiments.

FIG. 7 illustrates a system 1300 for robust and efficient video tracking adaptable to traffic conditions. In one embodiment, the system is deployed in an environment 1330 such as along a street, as shown in FIG. 7. The environment 1330 may also be any other environment where video surveillance is preformed and the example of a street shown in FIG. 7 is provided solely as an example and not intended to limit the scope of the application.

Within environment 1330, a vehicle 1320 may be present on a roadway, in an intersection, in a parking facility or any other such environment. The vehicle 1320 travels through environment 1330 until it enters scene of interest or a region thereof 1310. As the vehicle 1320 enters scene of interest 1310, video acquisition module 204, herein shown as a video camera, collects video data of the area of interest 1310. It should be appreciated that the video data of the scene of interest 1310 may be continuously collected, or alternatively, video acquisition may be triggered when a vehicle enters the scene of interest 1310. Furthermore, video acquisition module 204 may save video data in a database and associated data structure such as a database stored in memory 104 of computer system 100.

Video camera 204 may be operably connected with a computer system 100 and/or network 200 as illustrated in FIGS. 1, 2, and 3. In FIG. 7, computer system 100 is shown with a number of associated modules used to implement the processing steps and/or modules shown in FIGS. 4 and 6.

As vehicle 1320 enters the scene of interest 1310, object extraction module 1205 extracts the initial instance of the vehicle 1320. The object extraction module 1205 can advantageously use a double difference technique, background subtraction, and/or a computer vision technique for object recognition and localization. These techniques may further require morphological operations.

Next, a target object representation of the scene of interest 1310 that contains the initial instance of the vehicle 1320 can be established using the object characterization module 1210. Object characterization module 1210 can use features of the target object, in this case vehicle 1320, to create a representation of the vehicle 1320. Object characterization module 1210 can use, for example, color features to create a histogram of or pixel values in the region where motion has been detected. Alternatively, texture appearance, gradient orientation and magnitude, and cloud of point descriptors (Harris Corners, SIFT, and SURF) can also be used to create the object representation.

The Motion Environment State module 1220 is used to determine parameters indicative of the Motion Environment State in the scene of interest 1310. This can be accomplished by evaluating a set of parameters indicative of the present state of motion. Motion Environment State module 1220 can be utilized to adjust the size of the search neighborhood in object localization module 1215.

Output from Motion Environment State module 1220 and object characterization module 1210 are provided to object localization module 1215. Object localization module 1215 determines the location of the vehicle 1320 on a frame-by-frame basis through area of interest 1310. Object localization module 1215 adjusts the size of the search neighborhood according to the input from the Motion Environment State module 1220 and then searches for the vehicle 1320 according to the established neighborhood size. In this way, vehicle 1320 can be tracked through area of interest 1310 efficiently and robustly. Object localization module 1215 may alternatively use template matching tracking, point tracking, mean shift tracking, particle filter tracking, or other tracking algorithms to track vehicle 1320.

Based on the foregoing, it can be appreciated that a number of embodiments, preferred and alternative, are disclosed herein. For example, in one embodiment a method for video-based object tracking comprises selecting at least one motion parameter from a plurality of motion parameters associated with a scene of interest, adjusting a size of a search neighborhood associated with the target object according to the at least one motion parameter, and determining a frame-by-frame location of the target object using the adjusted search neighborhood size in order to track the target object in the video data. The method of selecting the at least one motion parameter and adjusting the size of the search neighborhood can be applied separately to each of a plurality of motion directions associated the said scene of interest.

In another embodiment, at least one of the plurality of motion parameters associated with the scene of interest is selected according to at least one of a pattern of motion associated with the scene and a plurality of scene characteristics associated with the scene. Determining a frame-by-frame location of the target object further comprises applying at least one of template matching tracking, point tracking, mean shift tracking, and particle filter tracking.

In another embodiment, the method of selecting at least one motion parameter from the plurality of motion parameters associated with the scene of interest further comprises continuously reviewing and updating the selected at least one motion parameter according to a relative influence of the at least one motion parameter associated with the scene. The plurality of motion parameters comprises at least one of a traffic volume, a time of day, a day of the week, a specific date, a weather condition, an incident report, a vehicle count, a direction of motion, a location of motion, a speed, and an acceleration.

In an alternative embodiment, extracting an initial instance of an object of interest in acquired video data is accomplished by applying at least one of a double difference technique and a morphological filtering; a background subtraction technique and a morphological filtering; and a computer vision technique.

In an alternative embodiment, the search neighborhood is configured to be spatially dependent in order to account for at least one characteristic of the target object resulting from at least one of a perspective and a distortion of a camera collecting video data of the scene of interest.

In another embodiment, establishing a representation of a target object from the initial instance of the object of interest comprises applying at least one of a color features representation technique, a texture appearance technique, a gradient magnitude technique, a Harris Corners technique, a feature transform technique, a SIFT technique, and a SURF technique.

In an alternative embodiment, a method for video-based object tracking comprises selecting at least one motion parameter from a plurality of motion parameters associated with a scene of interest wherein the at least one of the plurality of motion parameters associated with the scene of interest is selected according to at least one of a pattern of motion associated with the scene and a plurality of scene characteristics associated with the scene, continuously reviewing and updating the selected at least one motion parameter according to a relative influence of the at least one motion parameter on the pattern of motion associated with the scene, adjusting a size of a search neighborhood associated with the target object according to the at least one motion parameter, and determining, based on the adjusted search neighborhood size, a frame-by-frame location of the target object in order to track the target object in the video data.

The steps of selecting the at least one motion parameter, continuously reviewing and updating the selected at least one motion parameter, and adjusting the size of said search neighborhood are applied separately to each of a plurality of motion directions associated with the scene of interest.

In another embodiment, determining a frame-by-frame location of the target object further comprise at least one of template matching tracking, point tracking, mean shift tracking, and particle filter tracking. In addition the plurality of motion parameters comprise at least one of a traffic volume, a time of day, a day of the week, a specific date, a weather condition, an incident report, a vehicle count, a direction of motion, a location of motion, a speed, and an acceleration.

In an alternative embodiment, the method of extracting an initial instance of an object of interest in acquired video data is accomplished by applying at least one of: a double difference technique and a morphological filtering; a background subtraction technique and a morphological filtering; and a computer vision technique.

In yet another embodiment, a video-based object tracking system comprises a video camera configured to collect video data, a processor, and a computer-usable medium embodying computer code, the computer-usable medium being coupled to the processor. The computer code comprising non-transitory instruction media executable by the processor is configured for selecting at least one motion parameter from a plurality of motion parameters associated with a scene of interest, continuously reviewing and updating the selected at least one motion parameter according to a relative influence of the at least one motion parameter associated with the scene, adjusting a size of a search neighborhood associated with the target object according to the at least one motion parameter, and determining, based on the adjusted search neighborhood size, a frame-by-frame location of the target object in order to track the target object in the video data.

The at least one of the plurality of motion parameters associated with the scene of interest is selected according to at least one of a pattern of motion associated with the scene and a plurality of scene characteristics associated with the scene.

In another example embodiment, the instructions for determining a frame-by-frame location of the target object further comprise instructions configured for at least one of template matching tracking point tracking, mean shift tracking, and particle filter tracking. The plurality of motion parameters comprises at least one of a traffic volume, a time of day, a day of the week, a specific date, a weather condition, an incident report, a vehicle count, a direction of motion, a location of motion, a speed, and an acceleration.

In another embodiment, the instructions are configured for extracting an initial instance of an object of interest in acquired video data by applying at least one of a double difference technique and a morphological filtering; a background subtraction technique and a morphological filtering; and a computer vision technique.

In an alternative embodiment, the instructions for establishing a representation of a target object from the initial instance of the object of interest comprises instructions configured for applying at least one of a color features representation technique, a texture appearance technique, a gradient magnitude technique, a Harris Corners technique, a feature transform technique, a SIFT technique, and a SURF technique.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for video-based object tracking, said method comprising:
   selecting at least one motion parameter from a plurality of motion parameters associated with a scene of interest;
   defining a motion environment state according to said selected at least one motion parameter, wherein said selected at least one motion parameter is indicative of a pattern of motion in said scene of interest;
   setting a size of a search neighborhood associated with a target object according to said motion environment state;
   adjusting said motion environment state as said pattern of motion in said scene of interest changes;
   adjusting said size of said search neighborhood associated with said target object in response to said adjusted motion environment state; and
   determining a frame-by-frame location of said target object using said adjusted search neighborhood size in order to track said target object in said video data.

2. The method of claim 1 wherein said steps of selecting said at least one motion parameter and adjusting said size of said search neighborhood are applied separately to each of a plurality of motion directions associated with said scene of interest.

3. The method of claim 1 wherein said at least one of said plurality of motion parameters associated with said scene of interest is selected according to at least one of a pattern of motion associated with said scene and a plurality of scene characteristics associated with said scene.

4. The method of claim 3 wherein determining a frame-by-frame location of said target object further comprises applying at least one of:
   template matching tracking;
   point tracking;
   mean shift tracking; and
   particle filter tracking.

5. The method of claim 4 wherein selecting at least one motion parameter from said plurality of motion parameters associated with said scene of interest, further comprises continuously reviewing and updating said selected at least one motion parameter according to a relative influence of said at least one motion parameter associated with said scene.

6. The method of claim 4 wherein said plurality of motion parameters comprises at least one of:
   a traffic volume;
   a time of day;
   a day of the week;
   a specific date;
   a weather condition;
   an incident report;
   a vehicle count;
   a direction of motion;
   a location of motion;
   a speed; and
   an acceleration.

7. The method of claim 1 further comprising extracting an initial instance of an object of interest in acquired video data by applying at least one of:
   a double difference technique and a morphological filtering;
   a background subtraction technique and a morphological filtering; and
   a computer vision technique.

8. The method of claim 1 wherein said search neighborhood is configured to be spatially dependent in order to account for at least one characteristic of said target object resulting from at least one of a perspective and a distortion of a camera collecting video data of said scene of interest.

9. The method of claim 1 wherein establishing a representation of a target object from said initial instance of said object of interest comprises applying at least one of:
   a color features representation technique;
   a texture appearance technique;
   a gradient magnitude technique;
   a Harris Corners technique;
   a feature transform technique;
   a SIFT technique; and
   a SURF technique.

10. A method for video-based object tracking, said method comprising:
   selecting at least one motion parameter from a plurality of motion parameters associated with a scene of interest, wherein said selected at least one motion parameter is selected according to at least one of a pattern of motion associated with said scene of interest and a plurality of scene characteristics associated with said scene of interest;
   defining a motion environment state according to said selected at least one motion parameter;
   continuously reviewing and updating said motion environment state according to a relative influence of said selected at least one motion parameter on said pattern of motion associated with said scene of interest;
   adjusting a size of a search neighborhood associated with a target object in response to said motion environment state; and
   determining, based on said adjusted search neighborhood size, a frame-by-frame location of said target object in order to track said target object in said video data.

11. The method of claim 10 wherein said steps of selecting said at least one motion parameter, continuously reviewing and updating said selected at least one motion parameter, and adjusting said size of said search neighborhood are applied separately to each of a plurality of motion directions associated with said scene of interest.

12. The method of claim 11 wherein determining a frame-by-frame location of said target object further comprise at least one of:
   template matching tracking;
   point tracking;
   mean shift tracking; and
   particle filter tracking.

13. The method of claim 11 wherein said plurality of motion parameters comprises at least one of:
   a traffic volume;
   a time of day;
   a day of the week;
   a specific date;
   a weather condition;
   an incident report;
   a vehicle count;
   a direction of motion;
   a location of motion;
   a speed; and
   an acceleration.

14. The method of claim 10 further comprising extracting an initial instance of an object of interest in acquired video data by applying at least one of:
   a double difference technique and a morphological filtering;
   a background subtraction technique and a morphological filtering; and
   a computer vision technique.

15. A video-based object tracking system, comprising:
   a video camera configured to collect video data;
   a processor; and
      a computer-usable medium embodying computer code, said computer-usable medium being coupled to said processor, said computer code comprising non-transitory instruction media executable by said processor configured for:
      selecting at least one motion parameter from a plurality of motion parameters associated with a scene of interest;
      defining a motion environment state according to said selected at least one motion parameter, wherein said selected at least one motion parameter is indicative of a pattern of motion in said scene of interest;
      setting a size of a search neighborhood associated with said target object according to said motion environment state;
      continuously reviewing and updating said motion environment state according to a relative influence of said selected at least one motion parameter associated with said scene of interest;
      adjusting said size of said search neighborhood associated with said target object in response to said updated motion environment state; and
      determining, based on said adjusted search neighborhood size, a frame-by-frame location of said target object in order to track said target object in said video data.

16. The system of claim 15 wherein said at least one of said plurality of motion parameters associated with said scene of interest is selected according to at least one of a pattern of motion associated with said scene and a plurality of scene characteristics associated with said scene.

17. The system of claim 16 wherein said instructions for determining a frame-by-frame location of said target object further comprise instructions configured for at least one of:
   template matching tracking;
   point tracking;
   mean shift tracking; and
   particle filter tracking.

18. The system of claim 16 wherein said plurality of motion parameters comprises at least one of:
- a traffic volume;
- a time of day;
- a day of the week;
- a specific date;
- a weather condition;
- an incident report;
- a vehicle count;
- a direction of motion;
- a location of motion;
- a speed; and
- an acceleration.

19. The system of claim 15 further comprising instructions configured for extracting an initial instance of an object of interest in acquired video data by applying at least one of:
- a double difference technique and a morphological filtering;
- a background subtraction technique and a morphological filtering; and
- a computer vision technique.

20. The system of claim 15 wherein said instructions for establishing a representation of a target object from said initial instance of said object of interest comprises instructions configured for applying at least one of:
- a color features representation technique;
- a texture appearance technique;
- a gradient magnitude technique;
- a Harris Corners technique;
- a feature transform technique;
- a SIFT technique; and
- a SURF technique.

* * * * *